Patented June 28, 1938

2,122,270

UNITED STATES PATENT OFFICE 2,122,270

PIGMENTATION OF RESINOUS CONDENSATION PRODUCTS

George H. Wilder, Arlington, N. J., assignor to E. I. du Pont de Nemours & Company, Wilmington, Del., a corporation of Delaware No Drawing. Application August 11, 1937, Serial No. 158,562

2 Claims. (Cl. 106—22)

This invention relates to the pigmentation of resinous condensation products and, more particularly, to the pigmentation of phenol-aldehyde condensation products.

The production of white pigmentation in cast resins of the phenol-aldehyde type has offered many serious difficulties. The simple addition of a white pigment has not been successful because of the difficulty of maintaining such pigment in a satisfactory, uniform dispersion throughout the mass during the several stages of preparation of the phenol resin.

Heretofore, white pigmentation of these cast resins has been attempted through the formation of salts in situ by chemical reaction in the mass. If the salt is insoluble in water, then the fact that its formation takes place at a stage in the preparation of the resin when the viscosity of the mass is still low, tends to lead to its precipitation in the form of crystals of undesirably large size and of correspondingly poor covering power. Also, because of the comparative fluidity of the mass, this procedure runs into the same difficulty of maintaining dispersion mentioned above. It has also been proposed to produce a water soluble salt in situ but only limited pigmentation has been provided thereby and opacity is not obtained in a full range of commercial thicknesses because the disturbing effect of the reagents used to form the salt, upon the pH of the reaction mass, has made necessary an undesirable restriction upon the quantities in which such reagents can be used.

An object of the present invention is to provide a new and improved method of securing white pigmentation of cast resins of the phenol-aldehyde type and, more specifically, securing opacity in such resins in a full range of commercial thicknesses. A further object is to accomplish this result without disturbing the progress of the resin reaction through deviations from desirable hydrogen ion concentrations. A still further object is to provide a method which is subject to simple control and readily capable of giving reproducible results. Other objects of the invention will be apparent from the description given hereinafter.

The above reactions are accomplished according to the present invention by interacting in the reaction mass of phenol and aldehyde a substantially water-insoluble calcium compound with lactic acid to form calcium lactate and precipitating the calcium lactate therein. More specifically, the above objects are accomplished by condensing phenol and formaldehyde in the presence of solid calcium hydroxide and calcium carbonate together with lactic acid in an amount sufficient to react with only a part of the calcium compounds, adding to the reaction mass a further quantity of lactic acid in excess of that required to complete the neutralization of the calcium compounds, distilling off the water contained in the mass until it has reached the highest viscosity at which it can be readily poured into molds, and finally hardening or curing the mass, during which last step the calcium lactate formed precipitates in minute crystals uniformly dispersed throughout the mass.

Due to the fact that the calcium compounds added to the reaction mass prior to the condensation are substantially insoluble in water, they do not cause an undesirably high pH in the reaction mass regardless of their concentration, which allows the concentration of calcium lactate to be formed in the final product to be determined by the opacity desired without any limit thereon due to outside considerations.

The following examples, wherein parts are given by weight, illustrate specific embodiments of the invention:

*Example I.*—The following ingredients are used in the manufacture of a batch of resin which will yield about 20 parts of finished product:

|  | Parts |
|---|---|
| 91% solution of phenol in water | 14.9 |
| Formaldehyde solution (37%) | 25.5 |
| Lactic acid (first addition) | 0.143 |
| Calcium hydroxide (200 mesh powder) | 0.379 |
| Calcium carbonate (pulverized) | 0.132 |
| Lactic acid (second addition) | 2.83 |
| Potassium ferrocyanide solution (1%) | 0.88 |

The phenol, the formaldehyde solution, and the first quantity of lactic acid are mixed together and deaerated for ten minutes with nitrogen gas in accordance with the method disclosed in applicant's U. S. Pat. 2,058,649 entitled "Manufacture of phenol-aldehyde resins". There are then added successively the calcium hydroxide and the calcium carbonate. The whole mass is heated to boiling under a reflux condenser and with nitrogen gas bubbled slowly through it, the condensation proceeding while the pH of the reaction mass is maintained at the level of 6.8 to 6.9. This condensation in an acid medium is continued until a test portion removed from the batch is found to be precipitated immediately upon the addition of a further quantity of lactic acid. The reaction up to this point requires about 115 minutes.

The second portion of lactic acid is now added to the reaction mass and this depresses the pH to about 4, a hydrophobe resin being precipitated while a hydrophile resin remains in aqueous solution.

To the batch, in a dehydration kettle, is now added the potassium ferrocyanide solution, the purpose of which is explained in said U. S. Pat. 2,058,649. Dehydration is then commenced by heating under vacuum and it is carried to that point at which active bubbling ceases, or for a total of about 20 minutes. The heating is then discontinued to avoid premature hardening of the mass and the batch is poured into lead molds in which it is hardened or cured by being subjected to a temperature of about 80° C. for from 20-24 hours. The cast resin removed from the molds is an attractive opaque white in appearance.

In the above example, the condensation reaction is carried out in an acid medium held automatically at a level of substantially 6.8 to 6.9. The lactic acid and the phenol form the acidic influences in the reaction mass while the calcium hydroxide, being a base of weak character and in a form not immediately soluble in water, does not exert initially all of its alkalizing influence, nor is it present in proportions sufficient to neutralize the solution completely. The calcium carbonate, which is capable of interacting with acidic reagents but which is insoluble in the vehicle of the reaction, appears to be the principal buffering agent since it reacts with any formic acid produced during the condensation reaction after the calcium hydroxide has been depleted.

Most of the calcium lactate is formed after the addition of the second, and larger, portion of lactic acid which exceeded the amount necessary for combining with the calcium and thereby depresses the pH of the aqueous mass. But the mass does not show white pigmentation at this stage since the calcium lactate remains substantially dissolved until the hardening or curing of the resin.

*Example II.*—This example illustrates the addition of all of the lactic acid at one time. The following ingredients are used:

| | Parts |
|---|---|
| 91% solution phenol in water | 14.9 |
| Formaldehyde (37.2%) | 25.5 |
| Calcium hydroxide (200 mesh powder) | 0.24 |
| Calcium carbonate (pulverized) | 0.32 |
| Lactic acid | 2.0 |
| Potassium ferrocyanide solution (1%) | 0.88 |

The entire amount of lactic acid is added after the condensation has been completed at a pH of 6.8 to 6.9. The operations otherwise are the same as in Example I.

It will be understood that the above examples are merely illustrative and that the invention is applicable generally to the formation of phenol-aldehyde resins regardless of the specific aldehyde selected. The phenol and formaldehyde may be used in different relative proportions and other pH values may be maintained during the condensation and dehydration. Also, other specific variations of procedure to facilitate formation of the resin, or to modify its properties, may be employed.

If the condensation of the phenol and formaldehyde is one which is to be carried out at a pH of above 7.0 but is followed by acidification prior to dehydration, the excess of lactic acid required for the formation of calcium lactate for the pigmentation, may be used as the means of effecting the acidification of the reaction mass. In a general way, the proportions of calcium compounds and lactic acid will be chosen to maintain more or less automatically the desired pH in the reaction mixture as those in the art will understand but this ordinarily allows sufficient variation so that the controlling factor as to the proportions used, is the amount of calcium lactate necessary to obtain the desired white pigmentation effect. Five percent of calcium lactate by weight of the cured resin is about the minimum to give a useful pigmentation effect while 10% is sufficient to give substantially complete opacity in a rod of only ⅛" diameter.

It has been found that a range of 0.75-4.0 parts by weight of calcium hydroxide to one part by weight of calcium carbonate represents about the practical limits of the ratio of the two calcium compounds and that the ratio of lactic acid to calcium ion, moles of the former per mole of the latter, should be within the range of 1.45-2.1 to 1.

Those skilled in the art will appreciate that, while the proportion of the calcium compounds to each other and to the lactic acid will usually be kept within the ranges given in commercial operations, the particular optimum proportions in any given instance, whether within or without such ranges, will depend upon the specific conditions prevailing and, in setting up proportions for a commercial operation, a certain amount of preliminary experimenting or testing will be carried out as is customary.

Unless the lactic acid is added subsequently to the condensation step, the formation of calcium lactate begins during that step and, in any event, prior to the hardening or curing step. Precipitation of the calcium lactate, however, takes place chiefly, as evidenced by the pigmentation of the mass, during the final hardening or curing of the resin. The reaction mass is highly viscous and approaching the condition of a solid during the hardening step when most of the precipitation of the calcium lactate occurs and it is believed that this accounts for the excellent pigmenting effect obtained, i. e., the highly viscous mass inhibits the formation of crystals of more than very minute size thereby making the precipitated substance highly effective in covering power and, also, prevents the aggregation and settling of the precipitated substance, thus incurring a uniform distribution of same throughout the finished resin.

Suitable soluble dyestuffs may be used in the present process and these dyestuffs in combination with the white pigmentation provided by the precipitated calcium lactate will give various colored opaque effects.

An advantage of the present invention is that it provides white pigmentation in phenol-aldehyde resins by a method which is easily controlled and will give readily reproducible results. The calcium lactate is formed in situ and maintained in a finely divided state which results in high covering power. A further advantage of the process of the present invention is that the formation of the calcium lactate not only does not involve using reagents which will suffer with the maintenance of a desirable pH during the reaction of condensation between phenol and formaldehyde, but actually assists in preventing deviations therefrom. This means that the percentage of the pigment which it is feasible to form, is not limited by any need of avoiding such irregularities and it is entirely practical by the present invention to precipitate sufficient calcium lactate to give complete opacity in cast phenol-formaldehyde resins in a full range of commercial thicknesses.

As many apparently widely different embodiments of this invention may be made without departing from the spirit and scope thereof, it is to be understood that the invention is not limited to the specific embodiments thereof except as defined in the appended claims.

I claim:

1. Process of producing pigmented phenol-formaldehyde condensation products which comprises condensing phenol and aqueous formaldehyde in the presence of solid calcium hydroxide and calcium carbonate together with lactic acid in an amount sufficient to react with only a part of the said calcium compounds, adding to the reaction mass a further quantity of the lactic acid in excess of that required to complete neutralization of said calcium compounds, distilling off at least a portion of the water contained in the reaction mass, and finally hardening said reaction mass whereby the calcium lactate formed therein is precipitated.

2. Process of producing pigmented phenol-formaldehyde condensation products which comprises condensing phenol and aqueous formaldehyde at a pH of substantially 6.8–6.9 in the presence of solid calcium hydroxide and calcium carbonate together with lactic acid in an amount sufficient to react with only a part of the said calcium compounds, adding to the reaction mass a further quantity of the lactic acid in excess of that required to complete the neutralization of the said calcium compounds, distilling off at least a portion of the water contained in said reaction mass, and finally hardening said reaction mass whereby the calcium lactate formed therein is precipitated, the proportion of calcium compounds employed being such that the calcium lactate amounts to 5–10% by weight of the finished condensation product.

GEORGE H. WILDER.